United States Patent [19]

Antoni

[11] 4,105,820
[45] Aug. 8, 1978

[54] WEATHERPROOF AND MECHANICALLY STABLE LAMINATE FOR ENCASING THERMAL INSULATION

[75] Inventor: Gerhard Antoni, Mannheim, Germany

[73] Assignee: Th. Goldschmidt AG, Essen, Germany

[21] Appl. No.: 639,001

[22] Filed: Dec. 8, 1975

[30] Foreign Application Priority Data

Dec. 7, 1974 [DE] Fed. Rep. of Germany ... 7440815[U]

[51] Int. Cl.² .......................... B32B 7/02; B32B 15/08
[52] U.S. Cl. ..................................... 428/213; 428/332; 428/461; 428/511; 428/920
[58] Field of Search .............. 428/332, 334, 335–337, 428/461, 464, 511, 512, 920, 213; 285/47

[56] References Cited

U.S. PATENT DOCUMENTS 2,222,343  11/1940  Wasserman ........................ 428/464

FOREIGN PATENT DOCUMENTS 2,129,358  8/1971  Fed. Rep. of Germany .......... 428/461
925,416  2/1963  United Kingdom ..................... 428/332

*Primary Examiner*—George F. Lesmes
*Assistant Examiner*—P. Thibodeau
*Attorney, Agent, or Firm*—Toren, McGeady and Stanger

[57] ABSTRACT

A laminate for encasing thermal insulation on objects comprising in the following order, an outer aluminum sheet, a first layer of polyethylene film, a layer of a kraft paper, a second layer of polyethylene film and a final sheet of aluminum foil, the laminate possessing excellent insulating ability as well as good weatherproof and mechanical stability properties.

2 Claims, 1 Drawing Figure

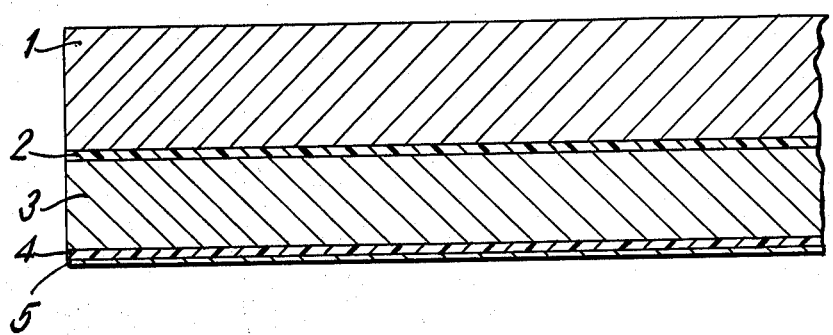

WEATHERPROOF AND MECHANICALLY STABLE LAMINATE FOR ENCASING THERMAL INSULATION

BACKGROUND OF THE INVENTION

1. Field of the Invention

This invention relates to the field of thermal insulation coverings. More particularly, this invention relates to encasing materials for wrapping about an insulating material.

2. Description of the Prior Art

It is known that pipes, equipment, and other objects can be thermally insulated, usually with mineral fibers, and that this insulating material can be protected against external influences, for example, weather, by means of a sheet-metal covering.

For this purpose, galvanized sheet iron as well as aluminum sheet has been used. The aluminum sheet is somewhat more desirable than the galvanized sheet metal since aluminum possesses both endurable weathering resistance as well as a greater ability to reflect heat radiation. However, the sensitivity of aluminum toward alkali is a distinct disadvantage of this material.

Consequently, corrosion damage can occur due to the action of moisture when an alkaline reacting insulating material, e.g., calcium silicate, is used. Corrosion damage can also be observed when the aluminum comes into contact with other metals, for example, the baling wire on the insulation, which results in the formation of local electrolytic cells.

The damaging effect of the alkali, as well as the formation of the local electrolytic cells, can be avoided by enveloping or wrapping the insulation with a plastic film. However, this incurs additional costs.

A significant improvement in such encasing material was achieved by furnishing the reverse side of the aluminum sheet with a barrier for protection against corrosion by laminating a polyethylene coated kraft paper web, i.e., the side of a kraft paper web which was coated with polyethylene film on one side. However, such a laminate has the disadvantage that the high heat-radiation reflecting ability of the aluminum on the reverse side is lost due to the insulating system. Also, the additional cost of such an insulating sheeting due to the lamination on the reverse side has limited its application to calcium chloride insulation material. This type of material is conventionally used in the United States due to the natural occurrence of calcium silicate. Thus, the insulating material obtained from calcium silicate is so mechanically stable that the thickness of the aluminum sheet can be substantially reduced so that the aluminum sheeting which is furnished on the reverse side of the above-described lamination is sufficiently thin as to be economically feasible.

However, in Europe and particularly, in Germany, the most readily available insulating material is mineral fibers, such as, for example, glass wool or basalt stone wool. This material possesses a much looser construction than the calcium chloride insulating material. Consequently, the insulating sheeting which is used for this type of material must possess substantially greater mechanical stability and, must be correspondingly thicker.

For economic reasons, an aluminum sheet having a thickness required by the mechanical stability considerations cannot also be furnished on its reverse side with the above-described corrosion barrier although this would be advantageous in view of the danger of pitting corrosion.

SUMMARY OF THE INVENTION

Applicants have discovered an insulation sheathing which is not only durably weatherproof and possesses excellent mechanical stability, but also is economically feasible for use with the types of insulating materials used in Europe. Indeed, the present invention is as durably weatherproof and mechanically stable as an aluminum sheet of a much greater thickness. However, in this case, the aluminum sheet which is actually used possesses a decreased thickness. Also, the aluminum sheet is protected against corrosion while, at the same time, its ability to reflect heat radiation is maintained.

More particularly, the present invention comprises a laminate for sheathing thermal insulating material which is composed of, in the following order, an outer aluminum sheet, a polyethylene film, a layer of kraft paper, a second polyethylene film and a final layer of aluminum foil, all the layers being bound to the next adjacent layer.

BRIEF DESCRIPTION OF THE DRAWINGS

The FIGURE is a cross-sectional view of a laminate in accordance with the present invention.

DESCRIPTION OF THE PREFERRED EMBODIMENT

It is particularly noted that the kraft paper which is laminated by means of the polyethylene film to the two aluminum layers exhibits a stiffening function on the entire laminate. As a result, the thickness of the aluminum sheet layer can be reduced. It is noted, in this regard, that the outer aluminum layer, i.e. the thicker aluminum layer is referred to herein as the aluminum sheet, whereas the thinner aluminum layer is referred to as aluminum foil.

Additionally, in order to avoid the deterioration in the supporting function of the kraft paper due to the effect of moisture, the kraft paper is coated on the reverse side with another polyethylene film to which the aluminum foil is laminated which reflects heat radiation. It is possible, of course, to replace the polyethylene film with another polymeric film material which would achieve the same purpose so long as such material will serve to bind the layers together and provide the appropriate moisture and corrosion arresting properties and is also as economical as polyethylene film exhibits.

The individual layers of the laminate can vary in thickness depending on the particular use to which they are being put. However, a preferred laminate possesses an aluminum sheet with a thickness from about 200 to 800 $\mu$, and the two polyethylene films have a preferable thickness of about 10 to 30 $\mu$ each, the kraft paper possesses a preferable thickness of about 100 to 250 $\mu$, and the aluminum foil a preferred thickness of about 8 to 20 $\mu$.

The thickness of the aluminum sheet used is essentially determined by the mechanical stresses which will be placed on the laminate. Thus, for example, a sheathing for thermally insulated pipes of small diameter whose insulation is not particularly stressed mechanically can incorporate an aluminum sheet of about 200 $\mu$ which would be sufficient. However, thermally insulated equipment where the sheathing or laminate will be more mechanically stressed, for example, by being walked on, requires an aluminum sheet with an increased thickness, for example, 400, 600 or even 800 $\mu$.

The kraft paper which also provides for additional stiffness generally has a layer thickness of about 100 to 250 $\mu$. Thus, in the case where the aluminum sheet is, for example 600 $\mu$, which is required to attain the desired mechanical stability, a sheet thickness on only about 400 $\mu$ would be sufficient since the kraft paper would ensure the additional stiffness.

If, an aluminum sheet of 400 $\mu$ thickness would normally be required, using the laminate of the present invention, an aluminum sheet of only 200 $\mu$ would be sufficient when used in conjunction with a kraft paper having a thickness of 100 to 250 $\mu$. It is thus apparent that significant savings can be produced by using the multilayered sheathing material laminate of the present invention.

The polyethylene films used not only provide a moisture barrier for corrosion resistance, but also serve to secure the various layers to one another by conventional laminating precedures, e.g., heat laminating. Generally, the film thickness in excess of that required to provide the moisture barrier and provide for the binding and securement of the laminate is not required. Accordingly, a film thickness of about 10 to 30 $\mu$ generally suffices.

The aluminum foil possesses a high heat-reflecting capability for heat radiation and, at the same time, prevents adhesion of the polyethylene film to the laminating equipment during the manufacture of the multilayered sheathing material web by the conventional hot lamination procedure. Such danger does not exist, of course, with extrusion laminating wherein cooled rollers are used. However, the aluminum sheet must then be furnished with an appropriate adhesion primer. A very thin aluminum foil, such as that which is commercially available and generally possesses a thickness of about 8 to 20 $\mu$ suffices. It is, of course, laminated with its shiny side toward the outside.

Referring to the figure, the laminate of the present invention is shown wherein the aluminum sheet 1, is connected by means of the polyethylene film 2 to the kraft paper 3. The stiffening kraft paper is secured against the effects of moisture by means of polyethylene film 4 and the aluminum foil 5 is bound to polyethylene film 4 for purposes of increasing the reflecting capability as well as for the purpose of permitting a hot lamination.

As noted above, the laminate of the present invention can be prepared by conventional laminating procedures which are well known in the art.

Having thus described our invention, what is claimed is:

1. A laminate which is weatherproof and mechanically stable for encasing thermally insulated objects which comprises in the following order, an outer layer of aluminum sheet having a thickness of about 200 to 800 $\mu$, a first layer of polyethylene film, a layer of a kraft paper, a second layer of polyethylene film, and a final sheet of aluminum foil having a thickness of 8 to 20 $\mu$, said layers being bound to the next adjacent layer.

2. A laminate which is weatherproof and mechanically stable for encasing thermally insulated objects which comprises in the following order, an outer layer of aluminum sheet, a first layer of polyethylene film, a layer of a kraft paper, a second layer of polyethylene film and a final sheet of aluminum foil, said layers being bound to the next adjacent layer, wherein the aluminum sheet is about 200 to 800 $\mu$ thick, the polyethylene films are each about 10 to 30 $\mu$ thick, the kraft paper is about 100 to 250 $\mu$ thick and the aluminum foil is about 8 to 20 $\mu$ thick.

* * * * *